July 16, 1957 W. H. COULTER 2,799,216
APPARATUS FOR TREATMENT OF FLUIDS REQUIRING
STERILIZATION OR PASTEURIZATION
Original Filed Aug. 24, 1951
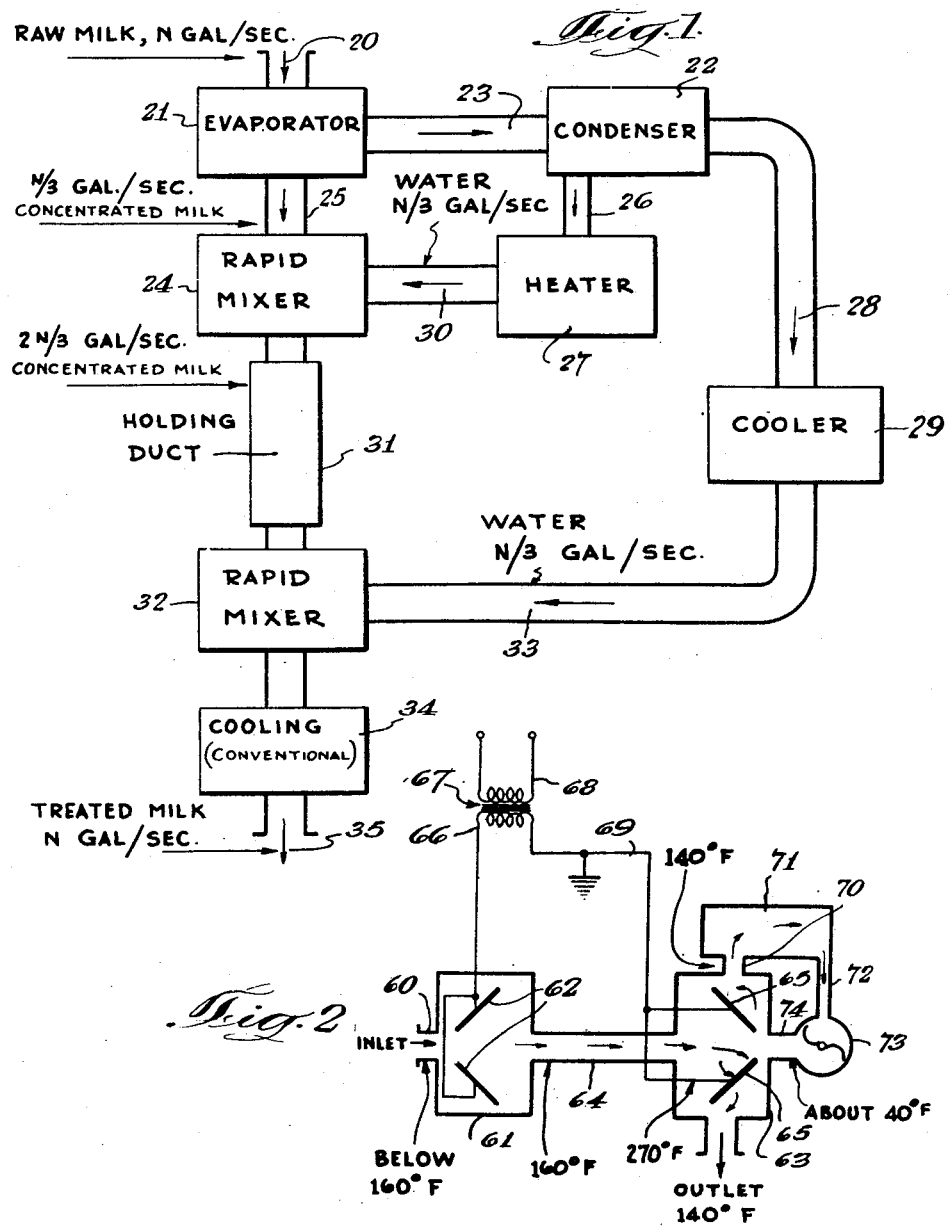

United States Patent Office 2,799,216
Patented July 16, 1957

2,799,216

APPARATUS FOR TREATMENT OF FLUIDS REQUIRING STERILIZATION OR PASTEURIZATION

Wallace H. Coulter, Chicago, Ill.

Original application August 24, 1951, Serial No. 243,478, now Patent No. 2,712,504, dated July 5, 1955. Divided and this application February 16, 1955, Serial No. 488,665

5 Claims. (Cl. 99—253)

This invention relates generally to the art of treatment of fluids requiring sterilization or pasteurization and storage. Such fluids comprise for example foods such as milk which need be treated by heating in order to render the same safe for consumption. The apparatus is concerned with the heating and the cooling of such fluids in manners to achieve pasteurization or sterilization in a simple and economical manner, and yet effectively, with less effect on taste than heretofore possible.

This application is a division from application Serial No. 243,478, filed August 24, 1951, now Patent No. 2,712,504, for Method and Apparatus for Treatment of Fluids Requiring Sterilization or Pasteurization.

Many fluids used for human consumption require treatment to destroy or substantially reduce the number of microorganisms such as bacteria carried by the fluids. Pasteurization of dairy products is almost universal and sterilization is also very common. Commercial methods of pasteurization and sterlization are all based upon the concept of heating the fluid to a given temperature and holding the same at that temperature to achieve the desired effect. A common method of pasteurization for example, is to heat raw milk to approximately 140° F. or a little better, for a length of time in the vicinity of half an hour.

It has been known that by increasing the temperature at which the fluid is maintained the time required to accomplish a given treatment is materially decreased. The effect on living organisms in milk, for example, increases at a much greater rate with rising temperatures than the effect on taste and other properties. In other words the time factor for a given effect on bacteria count can be greatly reduced as the temperature is increased with an increasingly small effect on palatibility. For example, milk pasteurization at 170° F. for 10 to 15 seconds is more complete than the older method of 140° F. for 30 minutes and the effect on taste is less. Temperatures much higher than 170° F. while much desired for more complete pasteurization, have heretofore been impractical and economically unfeasible.

The logical end to such requirements, namely the application of higher temperatures to achieve treatment desired with decreasing effect on taste, effectively is thwarted by limitations of presently employed methods, and indeed all methods known which are economically feasible. The primary obstacle is that the short time intervals cannot be achieved by such prior methods. Although the problem has been understood for many years, and although because of the great need many investigators have explored the field, no satisfactory solution heretofore has been presented to my knowledge. Known methods suffer either from inability rapidly to raise and/or lower temperatures or from adverse taste effects caused by contaminated heat transfer surfaces or electrodes in the case of direct contact electrical heating.

The invention contemplates a product which is economically heat treated, whether pasteurized or sterilized, with less effect on taste than heretofore has been believed possible.

Another important factor in the treatment of milk, for example, by heating the same, is the fact that milk is a staple food and is available in large quantities at relatively low price. The cost of high speed sterilization by known methods is expensive and if reflected in the eventual consumers' price will form a very substantial part of that price. This factor, together with the fact that milk handling equipment contaminates easily and must be constructed to permit easy disassembly thereof has more or less thwarted and retarded the wide spread use of high speed milk pasteurization and sterilization even by the use of known methods.

As far as I have been able to determine, there is no commercially successful high speed milk sterilization installation in use at this time despite the great advantages and salutary results that would flow from a practical and feasible method. Furthermore, those installations that have been produced are either experimental in nature or require such expensive and complex apparatus, such as for example radio frequency heating, as to make their possibilities of wide-spread adoption and economic operation quite remote.

My invention principally contemplates apparatus for the economical and practical heating of perishable fluids to high temperatures for pasteurization or sterilization thereof, such heating to occur in a matter of a fraction of a second and enabling treatment of large volumes of fluid with relatively compact and simple apparatus.

Accordingly the principal object of this invention is to provide such apparatus.

A further object of the invention is to accomplish the rapid heating or cooling of perishable fluids by intermixing the same with other fluids of different temperature whereby quickly to achieve a mean temperature without the necessity of using expensive apparatus.

A further object of the invention is to provide apparatus in which a perishable fluid such as milk is passed through a constricted duct and subject to low frequency current in the area to heat same at a rapid rate.

Other objects of the invention are to provide novel apparatus for achieving high speed cooling or heating of fluids by intermixture of the same.

Many other objects of the invention will become apparent as the description thereof proceeds. In order to assure a complete understanding thereof, I have described preferred embodiments of the apparatus, from which it will be appreciated that numerous variations in size, arrangement, proportion and construction of the various parts thereof are possible without departing from the spirit or scope of the invention. Consequently in the illustrations I have designated the elements diagrammatically in order not to be limited to any particular construction.

Fig. 1 is a flow diagram illustrating one form of the invention.

Fig. 2 is a flow diagram illustrating a second form of the invention.

Basically, the invention resides in the provision of apparatus capable of mixing fluids for the purpose of achieving high or low temperatures in very short intervals. The apparatus succeeds also in the recirculation of fluids for the above purpose, achieves high speed heating and is more economical than similar devices heretofore known. The apparatus for quickly heating fluids, such as milk, operates to subject the fluid to a restricted electrical current while passing through a relatively narrow conduit at high speed.

In Fig. 1, there is illustrated a phase of the invention the efficacy and advantages of which are all engendered by virtue of the high speed intermixture of the fluid of two different streams at different temperatures whereby to affect a temperature change desired.

The additional feature of the system of Fig. 1 is the separation of the incoming fluid into components which are separately treated and then re-united to produce the final product of the same properties as originally, except sterilized or pasteurized by high speed methods. For example, in the case of milk, the fluid can be separated into water or water vapor, and condensed or concentrated milk. The water or water vapor can be heated much higher and easier than the milk because of the precautions that must be taken with milk to prevent cooked taste, etc. Furthermore there is no time element involved in heating water or in cooling the same fairly economically. Its combinations with the condensed fluid are equally effective for cooling and for heating.

In Fig. 1 I have shown a stream of some untreated fluid entering the system, separated into two components, the heat sensitive portion and the non-heat sensitive portion. For convenience I have presumed the fluid to be raw milk, which separates into the concentrated milk and water, in the proportions of one to two respectively. Thus, raw milk enters the evaporator 21, and one third passes on to the rapid mixer 24 through conduit 25, while two thirds is converted into water vapor and is diverted through conduit 23 to the condenser 22. Half of the condenser output passes by way of conduit 26 to a heater 27 which may raise the temperature of the concentrated milk by rapid and thorough intermixture by any means such as described hereinafter. The water passes into the rapid mixer 24 through conduit 30 from the heater 27.

The second half of the condenser output is directed by the duct 28 to a cooler 29 which is connected by the duct 33 to another rapid mixer 32. Between the two rapid mixers, the milk is maintained at its high temperature acquired in rapid mixer 24, passing down a holding duct 31 of suitable construction. Thereafter the fluid passes to a conventional cooler 34 and out the port 35 to storage facilities.

This system illustrates that the separation of the fluid into its heat sensitive and non-heat sensitive components enables the insensitive components to be heated or cooled to temperatures quite a good deal different from that of the sensitive components, so that the heated or cooled insensitive parts can be used for achieving a product having a desired temperature easily and conveniently.

This is done through high speed mixing in suitable apparatus. Obviously the attainment of various temperatures by this means eliminates apparatus otherwise required which is costly both from cost and maintenance standpoints.

In the apparatus shown in Fig. 1, it is feasible and desirable under suitable conditions to use steam instead of hot water. Thus, heater 27 may be a steam generator. For a given amount of moisture considerably greater heat can be carried by steam than hot water. Thus, the greater part of the output of the condenser 22 may be directed into conduit 28 to give a larger cooling volume for intermixture with fluid passing into mixer 32.

Another refinement for the apparatus of Fig. 1 consists of pre-heating of the fluid prior to its entry into the first rapid mixer 24. Such pre-heating, easily done by conventional methods, may consist in bringing the temperature of the fluid, for example milk, up to 150°–160° F. It decreases the heat requirements of the hot steam being introduced to the rapid mixer to raise the temperature of the fluid.

In Fig. 2 I have diagrammatically illustrated a device which embodies my invention and which is highly economical to construct and to maintain. By means of this apparatus, fluid, say for example pre-heated milk, enters at a temperature of say 160° F., is rapidly heated to 270° F. to 300° F. and suddenly cooled to 140° F. at a high rate of speed. This is accomplished by electrical heating and re-circulation cooling. The stream enters at the inlet 60 into a chamber 61 whose principal purpose is to house the electrodes 62, the size of which dictates the geometry of chamber 61. The chamber 61 connects with a mixing chamber 63 by means of a duct 64 which is electrically insulated. In the chamber 63 and subject to the influence of the fluid passing into chamber 63 from the conduit 64 I provide similar electrodes 65. Both sets of electrodes 62 and 65 are connected to the ends of the secondary 66 or the transformer 67 which is a conventional type transformer having 60 cycle 230 volt A. C. connected across its primary 68. Note that the lead 69 of the electrodes 65 is preferably grounded.

The heating of the fluid stream is provided by electrical current flowing through the fluid in the constriction of the conduit 64. The electrodes are of cross section area much greater than the cross section area of the conduit 64 to reduce surface current density and surface contamination.

The electrodes need not be located in positions where they are in contact with the highest temperatures produced, which arrangement further reduces surface contamination. The electrodes may be cooled if desired by internally circulated coolant, or, for example in the case of the electrodes 65 in chamber 63, the incoming stream of cold fluid from the pump, described below, may be directed at said electrodes to reduce their surface temperature.

Fluid passing through the narrow duct 64 is subjected to an electric current which rapidly heats the same. As this heated fluid enters the chamber 63 it will be rapidly and turbulently intermixed with cooler fluid in the chamber and its temperature rapidly dropped, thereby accomplishing the desired end—namely rapid heating and rapid cooling thereafter. Thorough and complete mixing can be obtained by the use of deflecting plates, multiple apertures, cones, etc., all well-known in the art. This intermixing is symbolically indicated by arrows shown in the chamber 63.

In order to obtain the cooling effect, a portion of the fluid in the chamber 63 is constantly being drawn off at 70 at a temperature of approximately 140° F. and cooled in a cooler unit 71. The fluid from the cooler passes through the conduit 72 and is forced by the pump 73 back into the chamber 63 by way of inlet 74. Its temperature of 40° F. combines with the heated fluid coming from the holding duct 64 at a temperature of 270° F. to 300° F. so that the average temperature of the fluid in the chamber 63 is 140° F. more or less.

The insulated duct 64 need not be of uniform cross section throughout its length. Whether or not of uniform cross section the temperature rise per unit length will remain substantially the same, but the time "at temperature" will depend upon the cross sectional area because the velocity of the fluid can be varied by varying the shape of the conduit along its length. Thus velocity, capacity, and time at which the fluid is maintained at desired temperatures can be controlled in this apparatus by suitable geometry thereof. The time interval from heating to cooling is somewhat of the order of .1 second by my apparatus.

The apparatus heretofore described in connection with Fig. 2 involves the use of ordinary electric current for heating in contact with expensive high frequency heating methods which have been proposed. The apparatus is simple and effective. There is a minimum of surface contamination. In short, this type of heating is ideal, since it can effectively be accomplished in a small volume and at a great speed. This particular method of heating and the apparatus described could be used as the heater called for throughout the specification herein. Thus, for example, it could be used at 27 in Fig. 1.

With reference to the re-circulation of fluid through the cooler unit 71 a high circulating rate and a very low initial temperature are desirable and will result in greatest efficiency. Furthermore, although the volume of fluid in the chambers 61 and 63 and in the duct 64 should be kept as low as possible, the circulating volume in cooling unit 71 and its ducts is not critical. The percentage of fluid recirculated again and again can be kept low by proper engineering design.

It is believed that the invention has been sufficiently described to enable those skilled in the art to which same pertains to understand and practice the same. It is contemplated that considerable variation in details is quite possible without in any way departing from the scope of the invention as defined in the appended claims.

What it is desired to secure by Letters Patent is:

1. Apparatus for treating milk in continuous stream which comprises an evaporator having an inlet and outlet, said outlet being connected with rapid mixing means, means for condensing the removed vapor heating the same and leading at least a portion of the condensate at elevated temperature to said rapid mixing means to raise the temperature of milk passing from the said evaporator to the said mixing means, said mixing means being connected with second rapid mixing means, and means for leading another portion of said condensate to said second mixing means including a cooling device, whereby the condensate will be cooled and thereby lower the temperature of the fluid passing to the second mixing means from the first mixing means.

2. Apparatus for high speed sterilization or pasteurization of a continuous stream of fluid which is sensitive to heat comprising, a chamber having an inlet port, means connected to feed said fluid in a stream through the port, a second chamber having an outlet port, a narrow insulated conduit connected between said chambers, a heater comprising electrode means in each of said chambers the diameter of which is substantially greater than the cross-sectional dimension of the conduit, means for connecting a source of A. C. voltage between said electrodes to cause flow of current in a restricted path through said conduits simultaneously with passage of said fluid through the conduit, to achieve a desired elevated temperature for the fluid in the conduit, and means for controlling the period of time during which the fluid in the conduit remains at said elevated temperature comprising said conduit having a predetermined cross-section so related to the length thereof as to establish the velocity of the fluid through the conduit required to achieve said period of time, and means associated with said second chamber for cooling the heated fluid entering the same.

3. Apparatus as described in claim 2 in which said cooling means comprises a third chamber having a cooling device therein, said second chamber having an additional inlet and outlet, each communicating with said third chamber and arranged to effect passage of at least a portion of the heated fluid entering said second chamber out of said second chamber into said third chamber and thereafter to be cooled and returned to said second chamber for intermixture with heated fluid entering the second chamber through said conduit.

4. Apparatus as described in claim 3 in which there is a pump associated with said third chamber arranged to accelerate the return of cooled fluid into the second chamber.

5. Apparatus for achieving continuous pasteurization of a stream of milk at a high speed which comprises a coordinated installation including: a milk evaporator unit having an inlet and outlet, means connected with said inlet for introducing whole milk into the evaporator, a condenser unit having an inlet connected with the outlet of the evaporator and arranged to receive water vapor from the evaporator and condense the same, a rapid mixing device having a pair of inlets of which one is connected with said evaporator to receive concentrated milk from said evaporator, and a heater including conduit connections between said condenser and mixing device arranged to receive therein said condensed vapor, heat the same to a predetermined temperature and introduce desired portions of said condensed vapor at such elevated temperature to said mixing device to raise the temperature of the concentrated milk therein sufficiently to affect such pasteurization without adverse effects on the milk.

References Cited in the file of this patent

UNITED STATES PATENTS

| 2,392,197 | Smith et al. | Jan. 1, 1946 |
| 2,566,308 | Brewer | Sept. 4, 1951 |